United States Patent
Ng et al.

(10) Patent No.: US 11,810,242 B2
(45) Date of Patent: Nov. 7, 2023

(54) METHOD FOR STABILIZING RAYCAST AND ELECTRONIC DEVICE USING THE SAME

(71) Applicant: HTC Corporation, Taoyuan (TW)

(72) Inventors: Fan Yuan Ng, Taoyuan (TW); Ryan Jeffrey Hoback, Taoyuan (TW); Russell L McLellan, Taoyuan (TW); Edwin Alberto Fonseca, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 109 days.

(21) Appl. No.: 17/499,819

(22) Filed: Oct. 12, 2021

(65) Prior Publication Data

US 2023/0116121 A1 Apr. 13, 2023

(51) Int. Cl.
| | |
|---|---|
| G06T 15/06 | (2011.01) |
| G06T 19/00 | (2011.01) |
| G06F 3/04815 | (2022.01) |
| G06F 3/01 | (2006.01) |

(52) U.S. Cl.
CPC .......... *G06T 15/06* (2013.01); *G06F 3/011* (2013.01); *G06F 3/017* (2013.01); *G06F 3/04815* (2013.01); *G06T 19/006* (2013.01)

(58) Field of Classification Search
CPC ........... G06T 15/06; G06F 3/011; G06F 3/017; G06F 3/04815; G06T 19/006
USPC .................................. 345/44, 100, 418; 1/1
See application file for complete search history.

(56) References Cited

U.S. PATENT DOCUMENTS

| | | | | |
|---|---|---|---|---|
| 2018/0307303 | A1* | 10/2018 | Powderly et al. | G06F 3/013 |
| 2019/0034076 | A1* | 1/2019 | Vinayak et al. | G06F 3/0346 |
| 2019/0258320 | A1* | 8/2019 | Yang et al. | G06F 3/04847 |
| 2020/0219311 | A1* | 7/2020 | Dorin et al. | G06T 7/62 |
| 2022/0230399 | A1* | 7/2022 | Evangelista et al. | G06V 20/20 |

OTHER PUBLICATIONS

Shimmila Bhowmick Investigating the Effectiveness of Locked Dwell Time-based Point and Tap Gesture for Selection of Nail-sized Objects in Dense Virtual Environment Nov. 1, 2020, Virtual Event, Canada SUI '20 pages 4,5.*

* cited by examiner

*Primary Examiner* — Prabodh M Dharia
(74) *Attorney, Agent, or Firm* — JCIPRNET

(57) ABSTRACT

The embodiments of the disclosure provide a method for stabilizing a raycast and an electronic device. The method includes: determining a specific raycast associated with a hand gesture in a virtual environment; determining whether the hand gesture is a pinch gesture; and in response to determining that the hand gesture is the pinch gesture, locking the specific raycast during the pinch gesture.

14 Claims, 2 Drawing Sheets

METHOD FOR STABILIZING RAYCAST AND ELECTRONIC DEVICE USING THE SAME

BACKGROUND OF THE INVENTION

1. Field of the Invention

The present invention generally relates to a raycast controlling mechanism, in particular, to a method for stabilizing a raycast and an electronic device.

2. Description of Related Art

In some services that provide virtual environments, the system may determine a raycast based on the hand gesture of the user for the user to point to the desired object in the virtual environment by using the user's hand.

In some cases, when the user points to the desired object such that the corresponding raycast also points to the desired object, the user may perform some specific hand gestures (e.g., a pinch gesture) to select/activate the desired object. However, during the user performing the specific hand gesture, the corresponding raycast may be accordingly moved to leave the desired object, such that the user may not be able to accurately select/activate the desired object.

SUMMARY OF THE INVENTION

Accordingly, the present invention is directed to a method for stabilizing a raycast and an electronic device, which may be used to solve the above technical problem.

The embodiments of the disclosure provide a method for stabilizing a raycast, including: determining a specific raycast associated with a hand gesture in a virtual environment; determining whether the hand gesture is a pinch gesture; and in response to determining that the hand gesture is the pinch gesture, locking the specific raycast during the pinch gesture.

The embodiments of the disclosure provide an electronic device including a storage circuit and a processor. The storage circuit stores a program code. The processor is coupled to the non-transitory storage circuit and accesses the program code to perform: determining a specific raycast associated with a hand gesture in a virtual environment; determining whether the hand gesture is a pinch gesture; and in response to determining that the hand gesture is the pinch gesture, locking the specific raycast during the pinch gesture.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
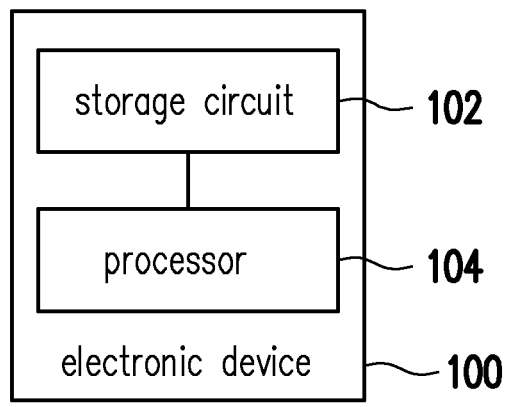
FIG. 1 shows a schematic diagram of an electronic device according to an exemplary embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram of an electronic device according to an exemplary embodiment of the disclosure. In various embodiments, the electronic device 100 may be any devices that could provide visual contents (e.g., reality service contents such as VR/AR/MR/ER contents) to the user. In the embodiments of the disclosure, the electronic device 100 may be a host of a reality service system (e.g., VR/AR/MR/ER systems), wherein the reality service system may include other elements such as a head-mounted display (HMD), a controller, a position tracking element, but the disclosure is not limited thereto. In other embodiments, the electronic device 100 may also be a standalone reality service HMD, which may generate and display reality service contents to the user thereof, but the disclosure is not limited thereto.

For better understanding the concept of the disclosure, the electronic device 100 would be assumed to be a host that could provide visual contents for the corresponding HMD to display, but the disclosure is not limited thereto.

In FIG. 1, the electronic device 100 includes a storage circuit 102 and a processor 104. The storage circuit 102 is one or a combination of a stationary or mobile random access memory (RAM), read-only memory (ROM), flash memory, hard disk, or any other similar device, and which records a program code and/or a plurality of modules that can be executed by the processor 104.

The processor 104 may be coupled with the storage circuit 102, and the processor 104 may be, for example, a graphic processing unit (GPU), a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 104 may access the modules and/or the program codes stored in the storage circuit 102 to implement the method for stabilizing a raycast provided in the disclosure, which would be further discussed in the following.

Figure 2:
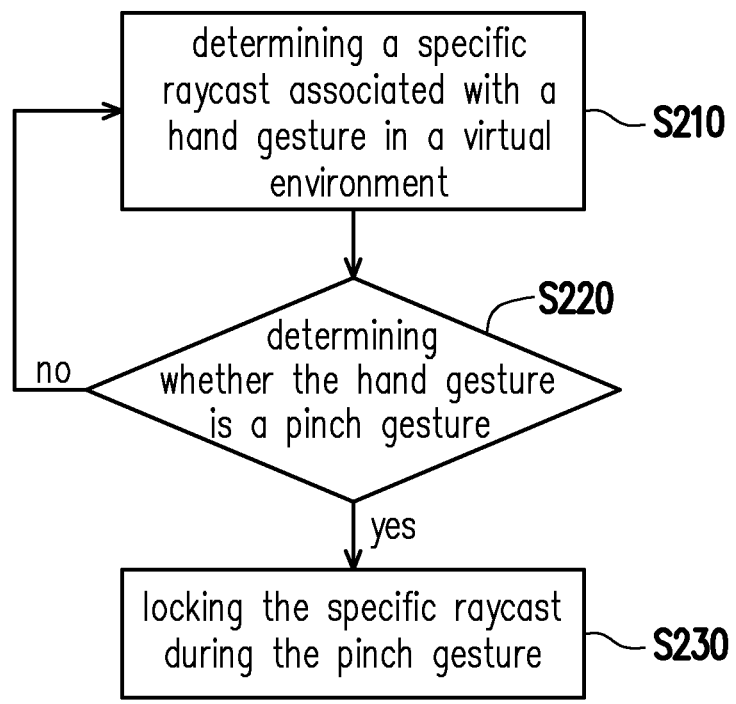
FIG. 2 shows a flow chart of the method for stabilizing a raycast according to an embodiment of the disclosure.

See FIG. 2, which shows a flow chart of the method for stabilizing a raycast according to an embodiment of the disclosure. The method of this embodiment may be executed by the electronic device 100 in FIG. 1, and the details of each step in FIG. 2 will be described below with the components shown in FIG. 1.

Firstly, in step S210, the processor 104 determines a specific raycast associated with a hand gesture in a virtual environment. For better understanding, FIG. 3 would be used as an example, wherein FIG. 3 shows a schematic diagram of determining a specific raycast associated with a hand gesture according to an embodiment of the disclosure.

Figure 3:
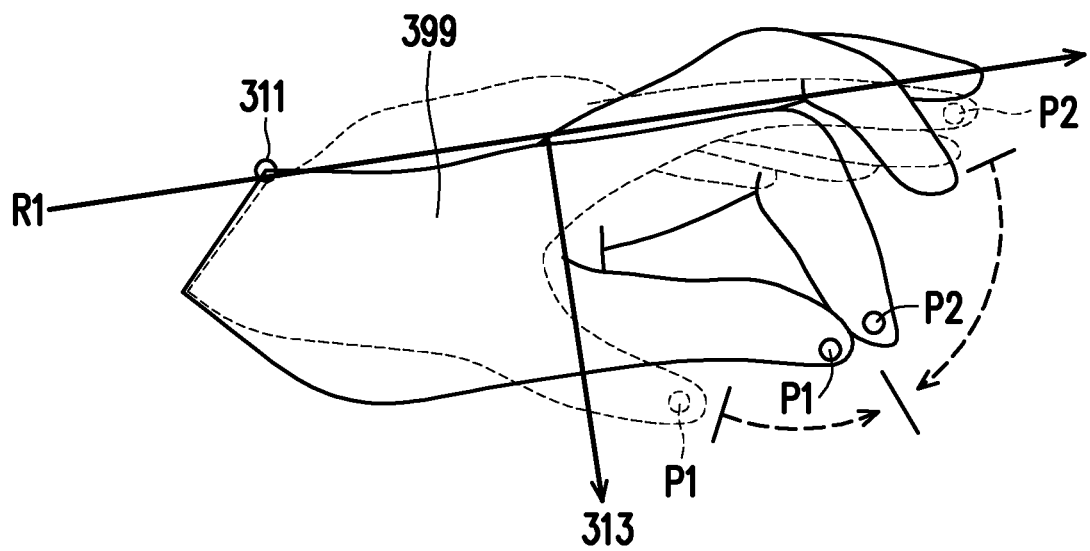
FIG. 3 shows a schematic diagram of determining a specific raycast associated with a hand gesture according to an embodiment of the disclosure.

In FIG. 3, the considered virtual environment may be a VR environment, and the user may interact with the VR environment by using the user's hand 399 to perform various hand gestures. The processor 104 may detect the hand gesture of the hand 399 via any existing gesture detecting algorithms and accordingly adjust the VR environment based on the detected hand gesture, but the disclosure is not limited thereto.

In one embodiment, in the procedure of determining the specific raycast R1 associated with the hand gesture of the hand 399, the processor 104 may determine a reference point 311 and a reference direction 313 on the hand 399. In FIG. 3, the reference point 311 may correspond to a wrist joint of the hand 399, and the reference direction 313 may be a normal direction of a palm of the hand 399. In other embodiments, the processor 104 may regard any other point related to the hand 399 as the reference point 311. In one embodiment, the processor 104 may firstly determine the plane corresponding to the palm of the hand 399 and accordingly define the normal direction of this plane as the reference direction 313, but the disclosure is not limited thereto.

After determining the reference point 311 and the reference direction 313, the processor 104 may determine the specific raycast R1 based on the reference point 311 and the reference direction 313 on the hand 399, wherein the specific raycast R1 passes the reference point 311 and is perpendicular to the reference direction 313, but the disclosure is not limited thereto. In other embodiments, the processor 104 may determine the specific raycast R1 associated with the hand 399 based on any existing raycast determining mechanism.

In step S220, the processor 104 determines whether the hand gesture is a pinch gesture. In one embodiment, the processor 104 may obtain a first finger point P1 and a second finger point P2 on the hand 399, wherein the first finger point P1 and the second finger point P2 correspond to different fingers on the hand 399. In FIG. 3, the first finger point P1 and the second finger point P2 may correspond to fingertips of a thumb and an index finger on the hand 399, but the disclosure is not limited thereto. In other embodiments, the first finger point P1 and the second finger point P2 may correspond to fingertips of any two fingers of the hand 399.

Next, the processor 104 may determine a relative speed between the first finger point P1 and the second finger point P2. In one embodiment, in response to determining that the first finger point P1 and the second finger point P2 are approaching to each other with the relative speed higher than a speed threshold, the processor 104 may determine that the hand gesture is the pinch gesture, otherwise the processor 104 may determine that hand gesture is not the pinch gesture. In various embodiments, the speed threshold may be designed to be any value chosen by the designer, e.g., 0.2 - 0.25 m/s, but the disclosure is not limited thereto.

In one embodiment, in response to determining that the hand gesture is the pinch gesture, the processor 104 performs step S230 to lock the specific raycast R1 during the pinch gesture. In one embodiment, the processor 104 may maintain the position of the specific raycast R1 in the virtual environment. Therefore, the specific raycast R1 would not be moved in response to the movement of the hand 399 during the pinch gesture.

In some embodiments, in response to determining that the specific raycast R1 is pointing toward a specific object in the virtual environment during the pinch gesture, the processor 104 may trigger the specific object. For example, if the specific object pointed by the specific raycast R1 is a virtual option in the virtual environment, the processor 104 may determine that the virtual option has been selected by the user and accordingly adjust the content of the virtual environment. For another example, if the specific object corresponds to a particular function provided in the virtual environment, the processor 104 may accordingly activate the particular function and accordingly adjust the content of the virtual environment, but the disclosure is not limited thereto.

Since the specific raycast R1 is locked during the pinch gesture, the user may trigger the specific object in a more stable way, which may improve the user experience of interacting with the virtual environment.

In other embodiment, in response to determining that the hand gesture becomes another gesture other than the pinch gesture, the processor 104 may unlock the specific raycast R1 and redetermining the specific raycast R1 associated with the hand gesture based on the teachings in the above, which would not be repeated herein.

In other embodiments, if the processor 104 determines that the hand gesture is not a pinch gesture in step S220, the processor 104 may perform step S210 to determine the specific raycast according to the current hand gesture. That is, the specific raycast R1 would move around in response to the movement of the hand 399. In some embodiments, if the hand 399 is detected to be performing the pinch gesture again, the processor 104 would lock the specific raycast R1 again for the user to interact with the virtual environment more accurately.

Figure 4:
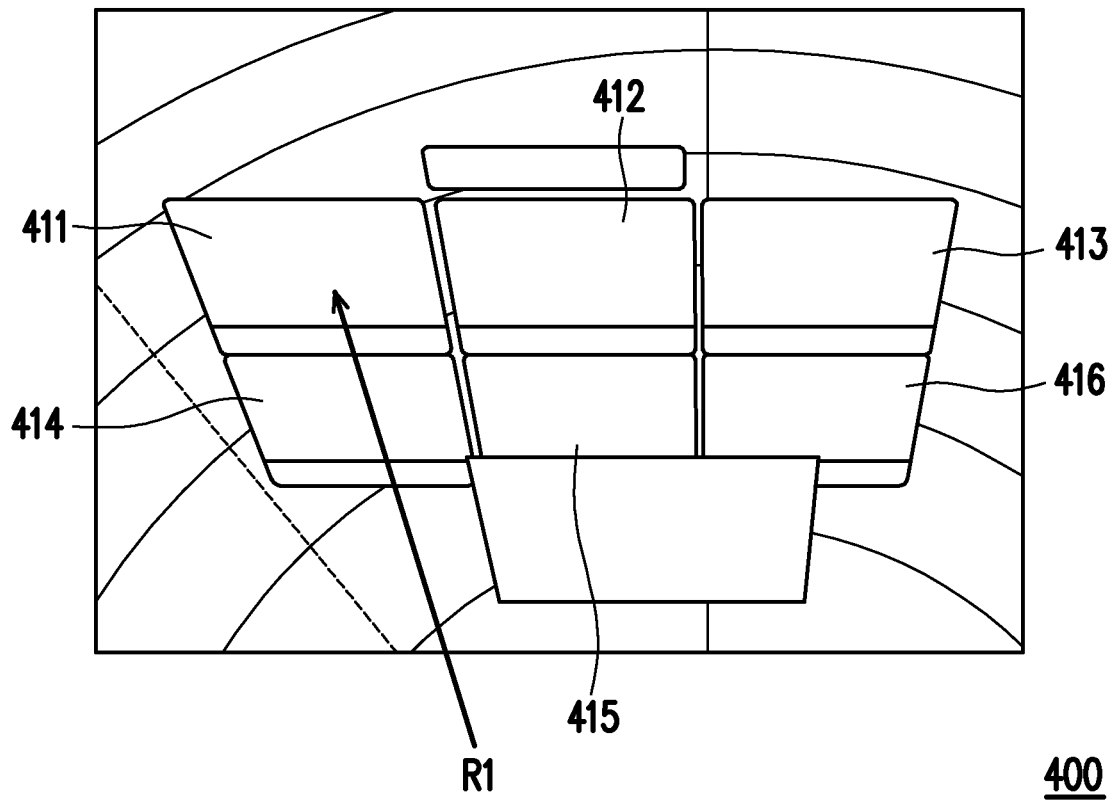
FIG. 4 shows an application scenario according to an embodiment of the disclosure.

See FIG. 4, which shows an application scenario according to an embodiment of the disclosure. In FIG. 4, the virtual environment 400 may be a VR environment providing options 411-416, wherein options 411-416 may correspond to different user interfaces, but the disclosure is not limited thereto.

In FIG. 4, assuming that the user performs a pinch gesture to select the option 411 when the specific raycast R1 is pointing to the option 411. In the conventional way where the specific raycast R1 is not locked during the pinch gesture, the specific raycast R1 may be accidentally moved to point to other options (e.g., the options 412 or 414) near the option 411, such that the user may accidentally trigger other undesired options.

However, since the processor 104 may lock the specific raycast R1 during the pinch gesture, the specific raycast R1 would stably point to the option 411 throughout the pinch gesture, such that the user may accurately trigger the desired option 411. Therefore, the user experience may be improved.

In summary, the disclosure may lock the raycast associated with the hand gesture when the user is performing a pinch gesture. Therefore, the raycast would not be moved in response to the movement of the user's hand during the pinch gesture. In some cases, when the user wants to trigger (e.g., select/activate) a virtual object in the virtual environment, the raycast would stably point to the virtual object throughout the pinch gesture, such that the user may interact with the virtual object in a more stable way.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for stabilizing a raycast, comprising:
   determining a specific raycast associated with a hand gesture in a virtual environment;
   determining whether the hand gesture is a pinch gesture;

in response to determining that the hand gesture is the pinch gesture, locking the specific raycast during the pinch gesture, comprising:
    maintaining a position of the specific raycast in the virtual environment during the pinch gesture.

2. The method according to claim 1, wherein the hand gesture is presented by a hand, and the step of determining the specific raycast associated with the hand gesture comprises:
    determining a reference point and a reference direction on the hand; and
    determining the specific raycast based on the reference point and the reference direction on the hand, wherein the specific raycast passes the reference point and is perpendicular to the reference direction.

3. The method according to claim 2, wherein the reference point corresponds to a wrist joint of the hand, and the reference direction is a normal direction of a palm of the hand.

4. The method according to claim 1, wherein the hand gesture is presented by a hand, and the step of determining whether the hand gesture is the pinch gesture comprises:
    obtaining a first finger point and a second finger point on the hand, wherein the first finger point and the second finger point correspond to different fingers on the hand;
    determining a relative speed between the first finger point and the second finger point; and
    in response to determining that the first finger point and the second finger point are approaching to each other with the relative speed higher than a speed threshold, determining that the hand gesture is the pinch gesture.

5. The method according to claim 4, wherein the first finger point and the second finger point correspond to fingertips of a thumb and an index finger on the hand.

6. The method according to claim 1, further comprising:
    in response to determining that the hand gesture becomes another gesture other than the pinch gesture, unlocking the specific raycast and redetermining the specific raycast associated with the hand gesture.

7. The method according to claim 1, further comprising:
    in response to determining that the specific raycast is pointing toward a specific object in the virtual environment during the pinch gesture, triggering the specific object.

8. An electronic device, comprising:
    a non-transitory storage circuit, storing a program code; and
    a processor, coupled to the non-transitory storage circuit and accessing the program code to perform:
    determining a specific raycast associated with a hand gesture in a virtual environment;
    determining whether the hand gesture is a pinch gesture;
    in response to determining that the hand gesture is the pinch gesture, locking the specific raycast during the pinch gesture, comprising:
    maintaining a position of the specific raycast in the virtual environment during the pinch gesture.

9. The electronic device according to claim 8, wherein the hand gesture is presented by a hand, and the processor performs:
    determining a reference point and a reference direction on the hand; and
    determining the specific raycast based on the reference point and the reference direction on the hand, wherein the specific raycast passes the reference point and is perpendicular to the reference direction.

10. The electronic device according to claim 9, wherein the reference point corresponds to a wrist joint of the hand, and the reference plane corresponds to a normal direction of a palm of the hand.

11. The electronic device according to claim 8, wherein the hand gesture is presented by a hand, and the processor performs:
    obtaining a first finger point and a second finger point on the hand, wherein the first finger point and the second finger point correspond to different fingers on the hand;
    determining a relative speed between the first finger point and the second finger point; and
    in response to determining that the first finger point and the second finger point are approaching to each other with the relative speed higher than a speed threshold, determining that the hand gesture is the pinch gesture.

12. The electronic device according to claim 11, wherein the first finger point and the second finger point correspond to fingertips of a thumb and an index finger on the hand.

13. The electronic device according to claim 8, wherein the processor further performs:
    in response to determining that the hand gesture becomes another gesture other than the pinch gesture, unlocking the specific raycast and redetermining the specific raycast associated with the hand gesture.

14. The electronic device according to claim 8, wherein the processor further performs:
    in response to determining that the specific raycast is pointing toward a specific object in the virtual environment during the pinch gesture, triggering the specific object.

\* \* \* \* \*